H. C. RASSMANN.
WATERING DEVICE FOR CATTLE.
APPLICATION FILED JUNE 30, 1919.
1,402,654.
Patented Jan. 3, 1922.
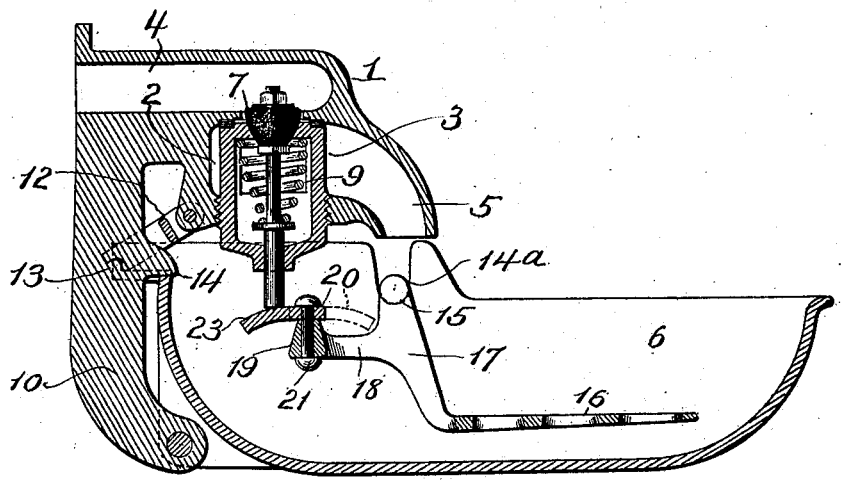
INVENTOR
H. C. Rassmann
By Seymour & Bright
Attorney

UNITED STATES PATENT OFFICE.

HUGO C. RASSMANN, OF BEAVER DAM, WISCONSIN, ASSIGNOR TO F. RASSMANN MANUFACTURING COMPANY, INCORPORATED, OF BEAVER DAM, WISCONSIN.

WATERING DEVICE FOR CATTLE.

1,402,654.     Specification of Letters Patent.     Patented Jan. 3, 1922.

Application filed June 30, 1919. Serial No. 307,563.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle, and more particularly to that type in which the flow of water from a fount to a drinking bowl is controlled by the animal through the medium of a lever disposed within the bowl and associated with the valve of the fount.

It is sometimes desirable to prevent the opening of the valve of the fount, as when it is necessary to prevent sick or overheated animals from drinking, and the object of my present invention is to provide simple and efficient means carried by the animal-operated lever, which will be operable normally to transmit movement from said lever to the valve of the fount to open said valve, but which may readily be shifted to prevent the opening of the valve when pressure is applied to the lever.

With this and other objects in view, the invention consists in certain novel features of construction and combinations of parts as hereinafter set forth and pointed out in the claims.

The accompanying drawing is a sectional view of a watering device showing an embodiment of my invention.

1 represents a fount having a chamber 2 therein for the accommodation of a valve cage 3, said fount being also provided with a duct or supply passage 4 adapted at one end for the reception of a suitable supply pipe, (not shown) and is adapted near its other end to communicate with the valve cage 3,—and said fount is also formed with a spout 5 communicating with the valve cage. The spout 5 is so located as to discharge into a drinking bowl 6.

The upper portion of the valve cage is provided with a seat for a valve 7,—the stem 8 of the latter projecting through and downwardly beyond the lower end of the valve cage and the valve is retained normally on its seat by the action of a spring 9.

The fount 1 may be provided with a depending arm or bracket 10, and the bowl may be provided with an extension pivotally connected with the lower portion of said arm or bracket. The bowl may be retained normally in a horizontal position by means of a latch 12 pivoted to the fount and adapted to engage a projection 13 on the bowl. A shoulder 14 projects from the bracket and is straddled by the latch, said shoulder constituting an abutment for the rear portion of the bowl.

The diametrically opposite walls of the bowl are made with bearings, as indicated at 14ª, for the trunnions 15 of a platform lever 16 disposed in the bowl above the bottom thereof so as to be operable by an animal in the act of drinking, to open the valve of the fount, as hereinafter explained. The platform lever is made with an upwardly extending portion 17 from which the trunnions 15 project and from the portion 17, an arm 18 projects rearwardly. The arm 18 is made at its free end with a boss or enlargement 19 and to said enlargement, a valve-operating member 20 is swiveled or pivotally connected by means of a pin 21 passing through said member and through a vertical opening in said enlargement. The member 21 may consist of a swiveled lug adapted to project rearwardly from the lever arm and under the depending end of the valve stem 9,—said lug or member 20 having a curved portion 23 to engage the valve stem and have sliding engagement therewith when the platform lever is moved on its pivotal supports.

It will be observed that when the member 20 is in the position shown in full lines and the platform lever is depressed by the animal in the act of drinking, the lever arm 18 will be raised and the lug or member 20, engaging the valve stem, will cause the valve to be raised and permit water to flow into the bowl.

It sometimes happens that it is desirable to prevent a sick or overheated animal from drinking and in order to prevent the operation of the valve by the animal, under such conditions, the operator may shift the swiveled member 20 so that it will become disposed out of line with the valve stem,— as indicated by dotted lines for example when the swiveled or shiftable valve operating member 20 shall have been thus shifted, the platform lever will drop and its inner end will rest upon the bottom of the bowl.

I have shown and described one embodiment of my invention, but various changes in the details of construction may be made without departing from the spirit of my invention or limiting its scope and hence I do not wish to restrict myself to the particular details herein set forth.

Having fully described my invention what I claim as new and desire to secure by Letters Patent, is:—

1. In a watering device, the combination with a valved fount, the stem of the valve of which depends below the fount, and a bowl, of a pivoted animal-operated lever in the bowl, said lever having an arm, and a valve-operating member movably supported entirely by said arm to be disposed under and in co-operative relation to the valve stem or out of such cooperative relation to the valve stem.

2. In a watering device, the combination with a valved fount and a bowl, the valve of said fount being provided with a depending stem of an animal operated lever pivotally supported by the bowl and having an arm projecting rearwardly from the axis of the pivotal support of the lever, and a member pivotally supported by said arm and adapted to be disposed under the valve stem of the valved fount, said member being shiftable away from said valve stem.

3. In a watering device, the combination with a valved fount and a bowl, of an animal operated lever pivotally supported in said bowl and having an arm projecting rearwardly from the axis of the pivotal support of said lever, a valve operating member, a vertically disposed pin pivotally connecting said member with the lever arm whereby it may engage under the valve stem of the valved fount, said member being shiftable horizontally away from under said valve stem.

4. In a watering device, the combination with a valved fount and a bowl, the valve of said fount being provided with a depending stem, of a pivoted animal operated lever having a rearwardly projecting arm, a curved lug for controlling the operation of the valve, said lug being pivotally supported by the lever arm and shiftable horizontally into and out of operative relation to the depending valve stem of the valved fount.

In testimony whereof, I have signed this specification in the presence of two subscribing witnesses.

HUGO C. RASSMANN.

Witnesses:
A. B. CHANDLER,
ARTHUR BEDKER.